United States Patent [19]

Ramier et al.

[11] Patent Number: 5,289,185
[45] Date of Patent: Feb. 22, 1994

[54] PROCESS FOR DISPLAYING FLYING AID SYMBOLS ON A SCREEN ON BOARD AN AIRCRAFT

[75] Inventors: Alain Ramier, Tournefeville; Daniel Duturc, Coloniers; Yves Saint-Upery, Toulouse, all of France

[73] Assignee: Aerospatiale Societe Nationale Industrielle, Paris, France

[21] Appl. No.: 753,109

[22] Filed: Aug. 30, 1991

[30] Foreign Application Priority Data

Sep. 5, 1990 [FR] France .................. 90 11023

[51] Int. Cl.$^5$ .................................... G01C 21/00
[52] U.S. Cl. ................... 340/971; 73/178 T; 340/972; 340/973; 340/974; 340/975; 364/428; 364/424.06
[58] Field of Search .......... 340/961, 967, 968, 970, 340/971, 972, 973, 974, 975, 976, 977, 978, 979, 980; 364/424.06, 461, 428, 439; 73/178 T; 342/29, 33

[56] References Cited

U.S. PATENT DOCUMENTS

| | | | |
|---|---|---|---|
| 3,784,969 | 1/1974 | Wilckens et al. | 340/972 |
| 4,121,246 | 10/1978 | Fadden et al. | 340/972 |
| 4,368,517 | 1/1983 | Lovering . | |
| 4,419,079 | 12/1983 | Georges et al. | 340/976 |
| 4,825,194 | 4/1989 | Rasinski | 340/975 |
| 4,999,780 | 3/1991 | Mitchell | 340/972 |
| 5,025,382 | 6/1991 | Artz | 340/979 |

FOREIGN PATENT DOCUMENTS 0222638  5/1987  European Pat. Off. .
0224278  6/1987  European Pat. Off. .
2389535  2/1978  France .
1252587  11/1971  United Kingdom .......... 244/187

OTHER PUBLICATIONS

Proceedings of the 1988 IEEE International Conference on Systems, Man and Cybernetics Aug. 8-12, 1988, vol. 1, pp. 506-508, Christopher Wickens et al.

*Primary Examiner*—Brent Swarthout
*Attorney, Agent, or Firm*—Michael N. Meller

[57] ABSTRACT

The invention relates to a process for the display on a screen on board an aircraft of flying aid symbols. On the basis of information supplied by an inertial system and ground beacons processed by an on board computer, the process consists of displaying on an on board screen (EV) symbols more particularly representing the wings of the aircraft (A1, A2), the model of the aircraft (CP), its speed (V), the tendency to acceleration and deceleration (AD1, AD2), a flight path prediction (PT), the artificial horizon (H), the roll angle ($\phi$), the sideslip (AL) and the total energy (ET1, ET2). It also consists of displaying the flight path to be followed in perspective (P1, P2, S3, S4, S5) and in projection (S'1 to S'5) on the plane of the runway. Any flight path segment during passage, as well as the segment following the latter are displayed in parallelepipedic form (P1, P2) in perspective. A final segment preceding the touchdown point of the wheels on the runway is displayed in the form of a pyramid (P3) in perspective. A display also takes place of the runway (P) and a grid (M1, M2, PE1, PE2) superimposed on said runway, in perspective.

17 Claims, 9 Drawing Sheets

PROCESS FOR DISPLAYING FLYING AID SYMBOLS ON A SCREEN ON BOARD AN AIRCRAFT

BACKGROUND OF THE INVENTION

The present invention relates to a process for displaying flying or piloting aid symbols on a screen on board an aircraft. The invention more specifically applies to the display of symbols assisting a pilot to act on the flight controls in such a way that the aircraft follows a predetermined flight path on approaching a runway and on landing. This flight path is formed by successive segments comprising runway approach segments and a final segment, covered just prior to landing, up to the touchdown point of the wheels on the runway.

SUMMARY OF THE INVENTION

Different processes for displaying on one or more on board screens of flying aid symbols are known, which facilitate the operations which have to be performed by a pilot when the aircraft is following a runway approach and landing procedure. These known processes are particularly used when the aircraft is making its final approach, i.e. when it is covering the final segment of a flight path terminating at the touchdown point of the wheels on the runway.

Most known processes are not very satisfactory. Among these, one of them is described in French patent 2 487 505. This process consists of recording in a memory of an on board computer, the coordinates of points of a predetermined flight path which must be covered by the aircraft, said coordinates being measured in a reference frame linked with the ground and having three orthogonal axes. The process then consists of defining a mobile reference frame linked with the aircraft and having three orthogonal axes, whose origin is the centre of gravity of said aircraft.

A first axis of this mobile reference frame corresponds to the longitudinal axis of the aircraft, a second axis is perpendicular to the plane of symmetry of the aircraft and a third axis is perpendicular to the first and second axes of the mobile reference frame. On board means make it possible to measure and record in the aircraft computer memory at predetermined times during the flight, the coordinates of the origin of the mobile reference frame relative to the reference frame (aircraft position) as well as the modulus and orientation of the speed vector of the aircraft. This orientation does not necessarily correspond with the aircraft's longitudinal axis. An on board inertial system supplies for the measured coordinates of the origin of the mobile reference frame, i.e. for the effective coordinates of the aircraft during flight, values respectively corresponding to the Eulerian or cardan angles. These angles, known as the roll, attitude and bearing angles, define the attitude of the aircraft. Their values are also recorded in the memory of the on board computer. The effective coordinates of the aircraft are measured by appropriate means receiving signals supplied by ground-fixed radio marker beacons.

The computer processes in real time the values of the different recorded parameters in order to control the on board display means making it possible, due to symbols displayed on a screen, to supply a significant aid to the pilot, so that the latter can act on the flight controls in order to follow the predetermined flight path in the best possible way.

These symbols in particular include an aircraft model symbol occupying a fixed position on the screen, an artificial horizon line moving on a screen as a function of the values of the Eulerian angles and altimetric data measured in the reference mark frame and a guide symbol formed by a rectangular window having sides respectively parallel and perpendicular to the artificial horizon.

The centre of this window is located on the screen by means of a processing of the effective coordinates of the Eulerian angles of the aircraft and the recorded reference coordinates corresponding to points of a segmented reference flight path which must be followed by the aircraft, in particular on approaching a runway. Another known symbol, whose display is essential for aiding flying and which is used in association with the guide window, is a symbol representing the orientation of the speed vector of the aircraft relative to the ground. Thus, in order to precisely follow the reference flight path, the pilot must act on the flight controls, so that the symbol representing the speed vector is in the centre of the guide window.

Other symbols are described in the aforementioned patent and make it possible for the pilot to improve the accuracy of passing through a flight path, as well as the flight conditions and will not be described here. However, the process of the aforementioned patent shows that it is possible to display a supplementary symbol, particularly when the aircraft is making its final approach to the runway. This symbol is a representation of the runway on the display screen, said runway appearing in perspective thereon. A line representing the axis of the runway is also displayed when passing through the final landing segment. In order that landing is carried out under good conditions, the guide window must be centred on the axis of the runway at a point corresponding to the wheel touchdown point, the roll angle having to be zero and the speed vector symbol being located in the centre of the guide window.

The process for the display of flying aid symbols on an on board screen described in the aforementioned patent remains unsatisfactory, although it proves flight safety and accuracy, particularly on the final segments of a flight path at the time just preceding landing.

Thus, although in the aforementioned patent the runway is symbolized in perspective, the pilot has no animated figuring or representation in three-dimensional form enabling him to instantaneously view in space the position of the aircraft with respect to the flight path, not only for the runway approach segments, but also for the final landing segment. In the process of the aforementioned patent logical deductions made mentally by the pilot enable him to determine the attitude and position of the aircraft relative to the desired flight path. At no point does the pilot see a symbolic image on the screen enabling him to instantaneously establish in three-dimensional form whether the aircraft is too far to the left, too far to the right, too high or too low with respect to the segment to be traversed. This is not very satisfactory for the approach segments, but becomes even more prejudicial for the final segment, because it is then that the pilot must react very rapidly in order to correct any aircraft attitude and position error.

The invention specifically aims at obviating these major disadvantages by means of a process for displaying on an on board screen characteristic symbols providing an effective flying aid, in such a way that an aircraft precisely flies through the approach segments and a final landing segment relative to a runway.

This process consists of displaying on a screen a symbolic, three-dimensional image which, during approach and landing, enables the pilot to have a direct view of the attitude and position of the aircraft relative to a final or approach segment. This symbolic three-dimensional image is in the form of a tunnel shaped like a parallelepiped in perspective and in which the aircraft must be located for passing through an approach segment. This tunnel is shaped like a pyramid for passing through a final segment. The apex of the pyramid corresponds to the intended touchdown point for the wheels on the runway. This parallelepiped or pyramid appears on the screen and gives the pilot an impression in perspective dependent on the relative position of the aircraft with respect to the segment to be traversed. For a correct traversal of the flight path, a symbol representing the aircraft must be constantly located in the tunnel surrounding the segment to be covered. The length of this tunnel decreases during the advance of the aircraft on a segment. The entry point into the tunnel constantly retreats in front of the aircraft and thus offers the pilot an aiming point, so that he can act as a consequence thereof on the flight controls and follow the desired flight path.

More specifically, the present invention relates to a process for the display of flying aid symbols on a screen on board an aircraft, for traversing a flight path formed by successive approach segments, a final segment and a rounding off segment traversed up to the touchdown point of the aircraft wheels on a runway comprising:

defining a fixed reference mark frame linked with the runway and having orthogonal axes, having for its origin a theoretical wheel touchdown point on the runway, said point being located on a longitudinal axis of the runway, the fixed reference frame having a first axis coinciding with the longitudinal axis of the runway, a second axis perpendicular to the first axis in a plane of the runway and a third axis perpendicular to the first and second axes of the reference mark frame;

defining a mobile reference mark frame linked with the aircraft and having for its origin the centre of gravity of the aircraft and a first axis coinciding with a longitudinal axis of the aircraft, a second axis perpendicular to a plane of symmetry of the aircraft and passing through the longitudinal axis and a third axis perpendicular to the first and second axes of the mobile reference frame;

recording in a memory of an on board computer, reference coordinates of the essential points of the segments of the flight path measured in the reference mark frame;

determining on the basis of information received from an inertial system, the coordinates of the effective positions of the aircraft relative to the reference mark frame, during the traversing of the flight path, as well as values respectively corresponding to the roll, attitude and bearing angles or Eulerian angles of the aircraft, and the orientations of a speed vector of the aircraft, measured in the reference mark frame;

displaying on said screen during the traversing of the flight path, an image obtained in a plane perpendicular to the first axis of the aircraft, in the vicinity of its centre of gravity, following the processing of the values of the Eulerian angles of the effective coordinates, the reference coordinates and the orientations of the speed vector, said image comprising at least:

two identical fixed symbols representing the aircraft wings, aligned on a first axis of the screen, parallel to the second axis of the mobile reference frame and passing through a central point of the screen, a symbol representing a model of the aircraft indicating the orientation of the longitudinal axis of the aircraft and moving along the first axis of the screen, between the two fixed symbols representing the wings of the aircraft, a line moving in translation and in inclination, called the artificial horizon, subdividing the screen into an upper part representing the sky and a lower part representing the ground, and making it possible to reference with respect to the model the roll and attitude angles of the aircraft during passage, said line being graduated so as to form a heading scale and for indicating the bearing of the aircraft, a symbol indicating the orientation of the speed vector of the aircraft and mobile along said orientation, along a second axis of the screen and passing through the central point and perpendicular to the first axis of the screen, characterized in that it also comprises displaying in accordance with a three-dimensional representation, approach segments located on the flight path to be covered by the aircraft, the segment being traversed, as well as at least the segment following that being traversed, being respectively displayed in accordance with two elongated parallelepipeds, in perspective, having respectively segments for axes, each parallelepiped in perspective having in the traversing direction of the corresponding segment, an entrance base into the segment and an exit base from the segment, said bases being rectangular, so that during the traversing of a segment, the entry base of a parallelepiped corresponding to said segment has a fixed dimension in the reference mark frame and the exit base an increasing dimension between a minimum dimension, when the aircraft starts to traverse this segment, and a maximum dimension equal to the dimension of the entry base with which it coincides, at the end of the traversing of said segment and at the start of the traversing of the following segment of the flight path, the process also consisting of displaying the final segment in the form of a pyramid in perspective and having a rectangular base, with on the screen an apex corresponding to the touchdown point of the wheels on the runway, so that during the traversing of the final segment, the base of the pyramid of the final segment has a decreasing dimension during the traversing of said final segment up to the touchdown point of the wheels, each base of the parallelepiped and the base of the pyramid having sides located on the screen as a function of the values of the Eulerian angles and coordinates of the origin of the mobile reference frame with respect to the fixed reference frame, the symbol indicating the orientation of the speed vector having to be located in the centre of the entry base of the parallelepiped in perspective, representing the segment being traversed, or in the centre of the base of the pyramid representing the final segment, when the aircraft is correctly located on a segment.

According to another feature, the entry base of each parallelepiped and the base of the pyramid are positioned beforehand with a constant delay in front of the aircraft.

According to another feature, at the start of traversing a rounding off flight path segment during which the aircraft leaves the final segment and joins a horizontal flight path immediately preceding wheel touchdown, the sides of the base of the pyramid retaining a constant dimension close to that of the speed vector symbol which is circular.

According to another feature, the process also consists of displaying on the screen the runway and the projection on the plane of the runway of the flight path remaining to be traversed.

According to another feature, the process also consists of displaying a roll scale shaped like a circular arc and rotatable about a central point of the screen, said scale having a first slide or cursor fixed to the screen and linked with said scale on the second axis of the screen, in order to indicate the direction of the third axis of the mobile reference frame, and a second slide or cursor moving with the scale and linked with the latter, located on a third mobile axis of the screen, passing through the central point of the screen and remaining parallel to the third axis of the reference mark frame during a roll movement, the roll angle being indicated by the displacement between the fixed cursor and the mobile cursor, and displaying the lateral acceleration or sideslip of the aircraft by a symbol mobile parallel to the first axis of the screen and linked with the first fixed cursor of the roll scale.

According to another feature, the process also consists of displaying an attitude scale extending along the third axis of the screen from the artificial horizon to the mobile roll scale.

According to another feature, the process also comprises displaying the tendency to acceleration or deceleration of the aircraft on the flight path, by two identical tendency indicating symbols arranged parallel to the first axis of the screen and mobile parallel to the second axis, said two symbols being located above the speed vector symbol if the tendency is to acceleration and below the speed vector symbol if the tendency is to deceleration, the distance between the speed vector symbol and the two acceleration or deceleration tendency symbols being proportional to the acceleration of the aircraft on the flight path.

According to another feature, the process also comprises displaying the variation direction of the total energy to be adopted for reaching a selected speed, by two identical energy variation direction symbols located parallel to the first axis of symmetry of the screen and symmetrically with respect to the second axis of the screen, said two symbols being mobile along said second axis of the screen, the distance between these two variation direction symbols and the speed vector symbol representing the difference between the selected speed and the effective speed of the aircraft.

According to another feature, the process also consists of displaying a flight path prediction by a symbol mobile on a line passing through the speed vector symbol and parallel to the artificial horizon line, said prediction symbol indicating the position of the aircraft at a predetermined future time projected onto the first two axes of the mobile reference frame.

According to an embodiment of the process according to the invention, the symbol representing a model of the aircraft moves along the first axis (YE) of the screen and the symbols representing the wings of the aircraft, the acceleration or deceleration tendency indicating symbols and the energy variation direction indicating symbols are positioned symmetrically with respect to the second axis of the screen.

According to a performance variant of the process, the symbol representing a model of the aircraft is fixed and located at the central point O' of the screen, the symbols representing the wings of the aircraft being positioned symmetrically relative to the second axis of the screen, the symbol indicating the orientation of the speed vector being mobile, in accordance with said orientation, on a first secondary axis of the screen parallel to the first axis of the reference mark frame and on a second secondary axis of the screen parallel to the second axis of the reference frame, the acceleration or deceleration tendency indicating symbols and the energy variation direction indicating symbols being positioned symmetrically relative to the second secondary axis.

According to another characteristic, the process also consists of displaying a flight path prediction by a symbol mobile on a line passing through the speed vector symbol and parallel to the artificial horizon line, said prediction symbol indicating the direction of the position of the aircraft at a predetermined future time and projected onto the two first axes of the mobile reference frame.

According to another feature, the process also consists of displaying the orientation of the runway on the artificial horizon by a mobile symbol linked with said artificial horizon, and positioned on the latter as a function of the value of the roll angle and the heading of the aircraft.

According to another feature, the process also consists of displaying the runway, the runway axis, a line perpendicular to the runway axis at the wheel touchdown point, and a grid of parallel lines perpendicular to the runway axis.

According to another feature, the process consists of using specific colors for the representation of the ground, the sky, symbols, the artificial horizon, scale cursors, the runway and the runway grid.

According to another feature, the process also consists of displaying on the screen complimentary information useful in the flying of the aircraft.

The invention is described in greater detail hereinafter relative to non-limitative embodiments and the attached drawings, wherein:

DESCRIPTION OF THE EMBODIMENTS

Figure 1:
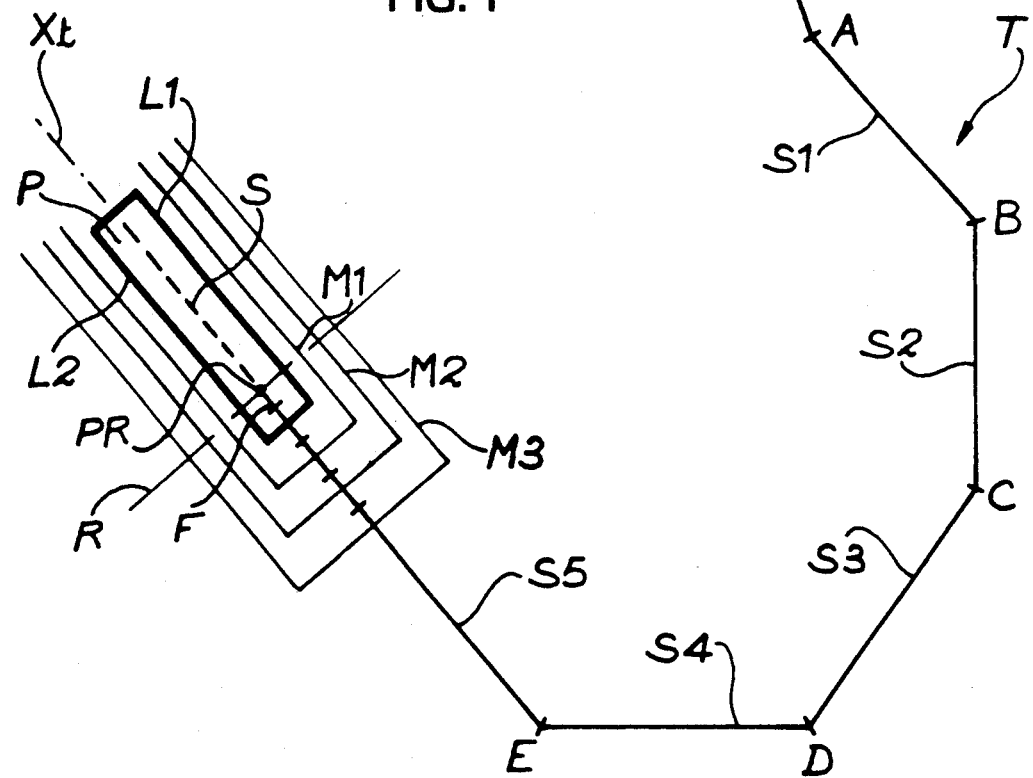
FIG. 1 shows diagrammatically a flight path of an aircraft, formed by approach segments and a final segment preceding landing, said flight path being projected in a horizontal plane.

FIG. 1 diagrammatically shows a runway P, whose axis Xt corresponds to segments S shown thereon. The actual runway on which the aircraft will be located on landing is defined by two lines L1, L2 and by "ground lines" M1, M2, M3, which define a grid for revealing the runway when the aircraft is remote from it. These lines also permit the centering of the aircraft on the runway axis when the aircraft is on the final segment. It is assumed that the aircraft is traversing a segmented flight path T, particularly when it is approaching the runway P. This flight path is shown in projection on a horizontal plane. The approach segments are designated S1, S2, S3 and S4. The final segment S5 is the last one traversed by the aircraft before the line R, perpendicular to the axis Xt at the point PR corresponding to the wheel touchdown point on the runway P. Between the traversing of the end F of the final segment S5 and the wheel touchdown point PR, the center of gravity of the aircraft undergoes a "rounding off" movement, which places the aircraft axis parallel to the runway plane at point PR.

Figure 2:
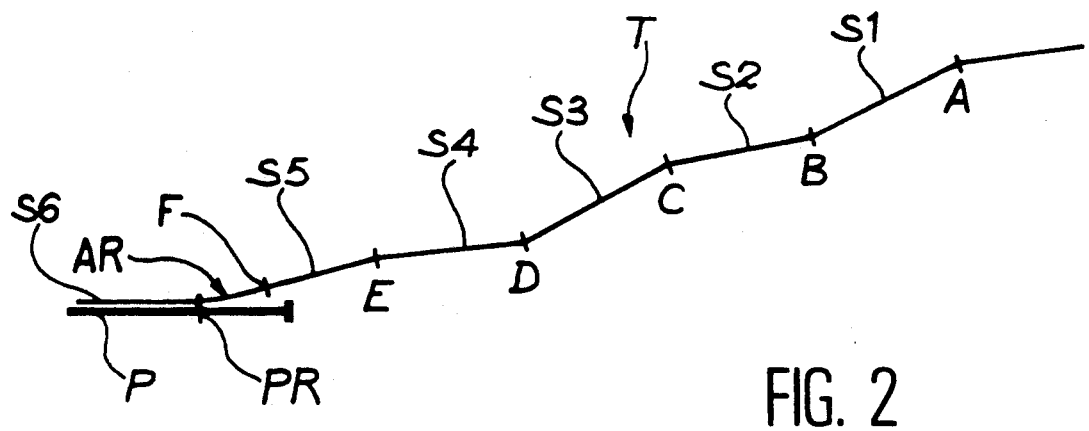
FIG. 2 shows diagrammatically the preceding flight path projected in a vertical plane.

FIG. 2 diagrammatically shows the flight path T of the aircraft, assumed to be projected in a vertical plane. It is easier to see in this FIG. 2 the final segment S5 and the wheel touchdown point PR, preceded by a rounding off AR, between the end F of the final segment S5 and the touchdown point PR.

Figure 3:
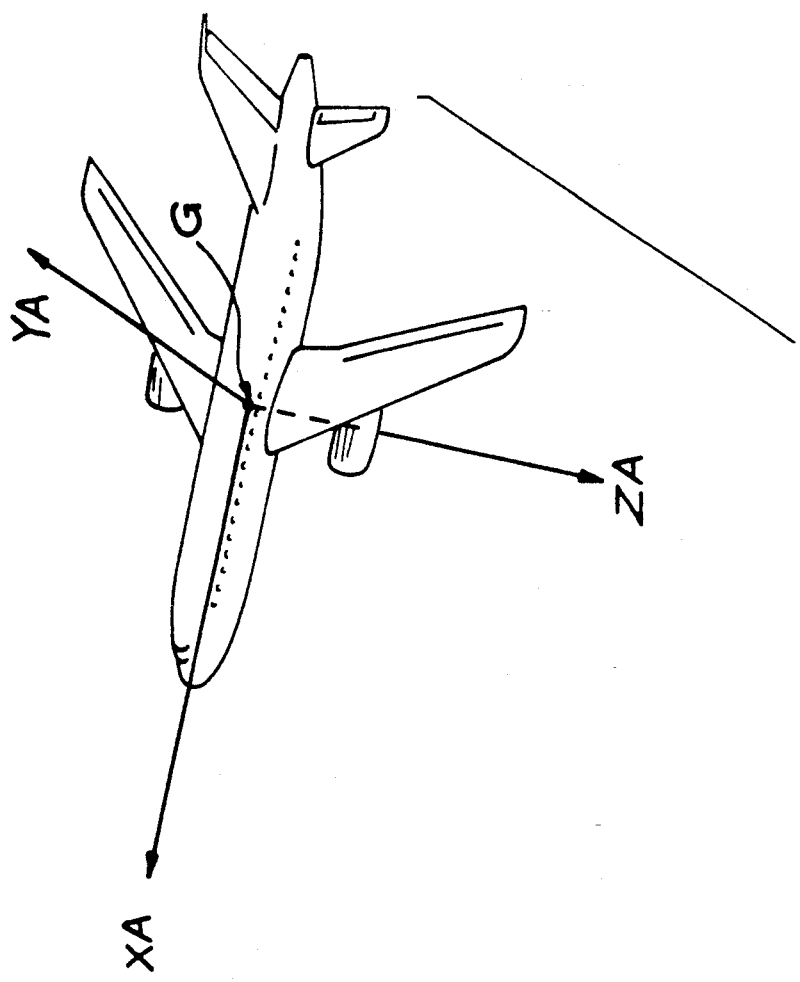
FIG. 3 shows diagrammatically a reference mark frame linked with the ground and a mobile reference frame linked with the aircraft.
Figure 3:
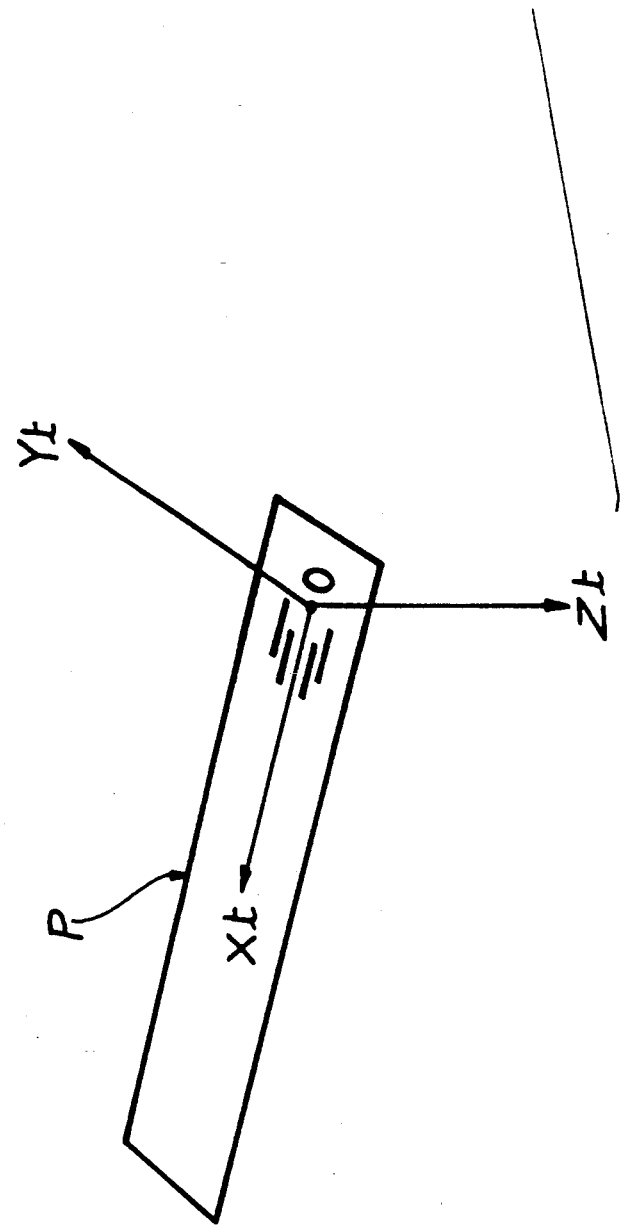
Figure 10:
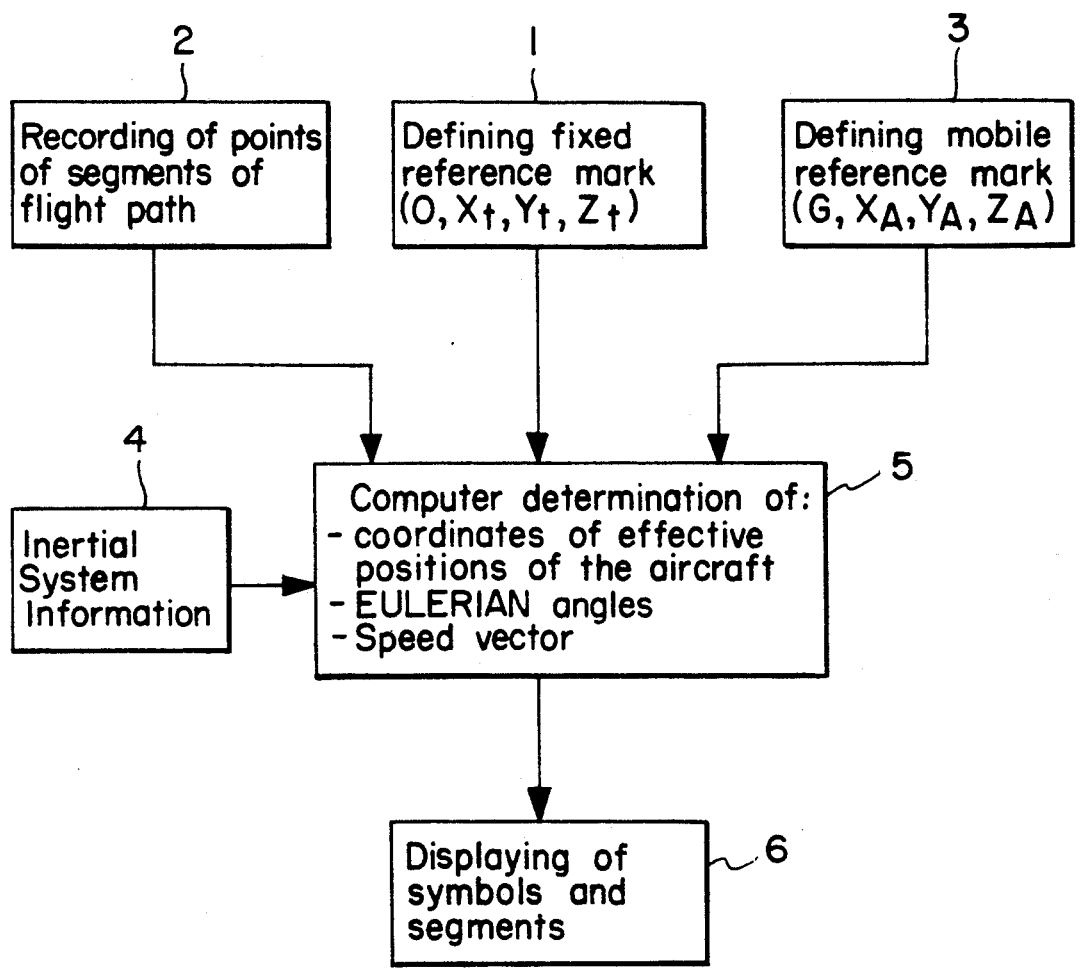
FIG. 10 is a flow chart describing the process steps of the invention.

The coordinates of the ends A, B, C, D, E, F of the approach segments and the final segment, as well as the intermediate coordinates of points of each segment are defined for each flight plan. The reference coordinates are assumed to be measured in a fixed reference mark frame O, Xt, Yt, Zt, linked with the ground and more specifically the runway P, as shown in FIG. 3 (step 1. FIG. 10).

The origin O of this reference frame is e.g. located on the runway axis, namely at the start thereof, at the wheel touchdown point. A first axis Xt of this reference frame corresponds to the runway axis, a second axis Yt is perpendicular to the first axis in the runway plane and a third axis Zt is perpendicular to the first and second axes Xt, Yt.

The reference coordinates are those of points of a flight path formed from approach segments and a final segment in predetermined form, on which the center of gravity G of the aircraft must be located in the desired flight conditions. These coordinates are recorded in a memory of an on board computer (step 2. FIG. 10).

The process according to the invention also consists of defining a mobile reference frame G, $X_A$, $Y_A$, $Z_A$ (step 3. FIG. 10) linked with the aircraft and having for its origin the center of gravity G thereof. A first axis $X_A$ of this mobile reference frame corresponds to a longitudinal axis of the aircraft passing through its center of gravity, a second axis $Y_A$ is perpendicular to a plane of symmetry of the aircraft passing through the longitudinal axis and a third axis $Z_A$ is perpendicular to the first and second axes $X_A$, $Y_A$ of the mobile reference frame.

On the basis of information supplied by an inertial system (step 4. FIG. 10) and received by the not shown, on board computer, determination also takes place of coordinates of the effective positions (step 5. FIG. 10) of the center of gravity of the aircraft, relative to the reference mark frame, during its approach. These effective coordinates are determined in known manner on the basis of information supplied by the inertial system, but also signals supplied by radio marking beacons linked with the ground. The effective position coordinates must, under normal flight conditions, be close to the corresponding reference coordinates.

Measurement also takes place of the aircraft attitude parameters, i.e. the respectively corresponding values of the roll, attitude and bearing angles of the aircraft (or Eulerian angles), as well as the corresponding orientations of the aircraft speed vector with respect to the reference mark frame (step 5. FIG. 10). The Eulerian angle values determining the attitude of the aircraft are measured in known manner by an on board inertial system. The orientations of the speed vector and the total energy values of the aircraft, for the effectively measured coordinates, are also measured by known means which will not be described here.

Figure 4:
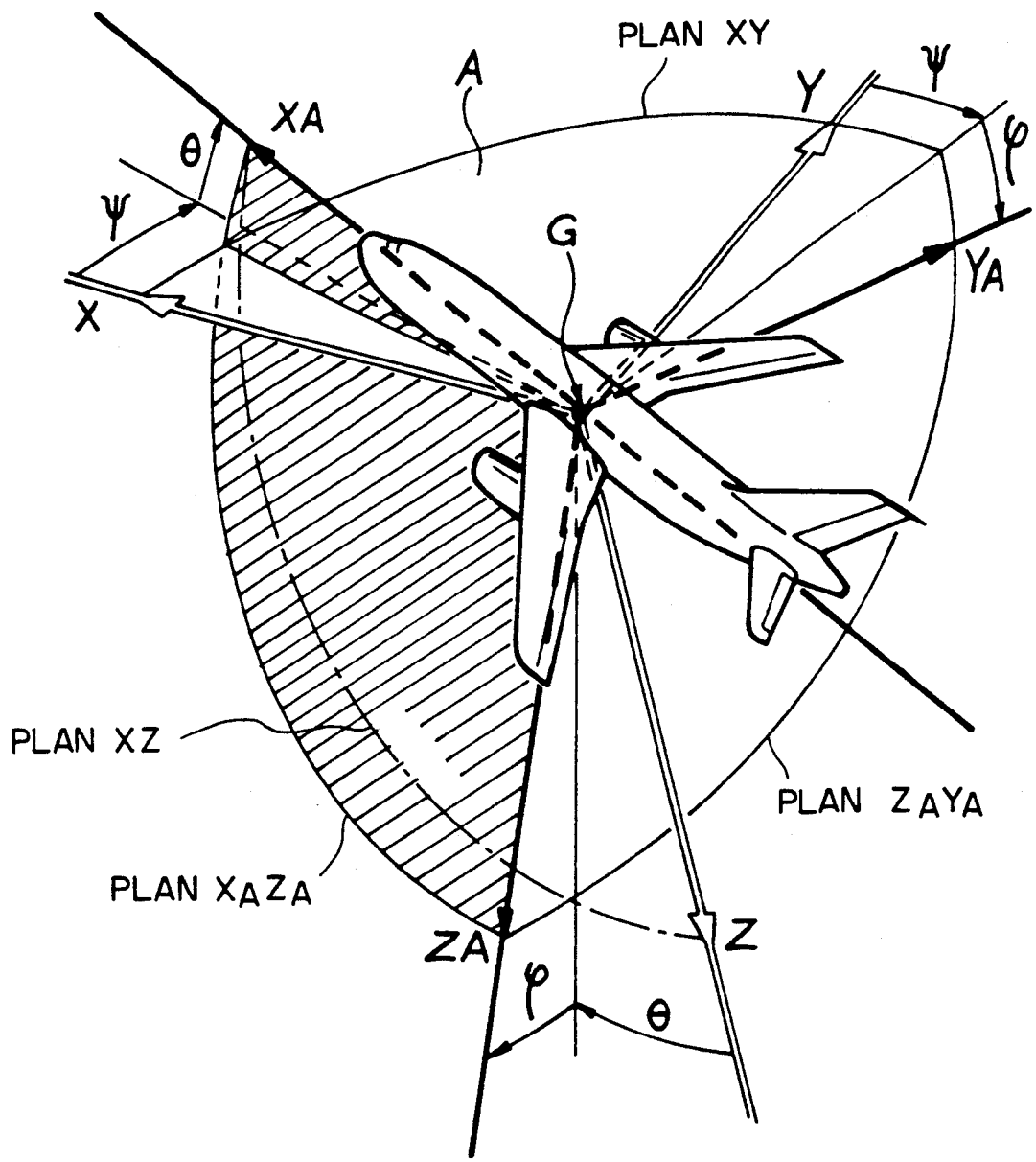
FIG. 4 shows a diagrammatic view providing a better understanding of the definition of the Eulerian angles.

FIG. 4 provides a better understanding of the definition of the Eulerian angles. The roll angle is designated $\phi$, the attitude angle by $\theta$ and the bearing angle by $\psi$. The angles are defined in the reference frame (G,X,Y,Z), which is a translated reference frame of the reference frame (O, Xt, Yt, Zt), the point O being brought into coincidence with the origin G of the mobile reference frame (G, $X_A$, $Y_A$, $Z_A$).

The bearing angle $\psi$ is the rotation angle about the axis Z of the translated reference mark frame, which brings the axis X thereof into coincidence with the projection of the axis $X_A$ of the mobile reference frame on the plane XY.

The attitude angle $\theta$ is the rotation angle about the axis Y of the translated reference frame, which brings the projection of the axis $X_A$ of the mobile reference frame onto the plane XY of the translated reference frame into coincidence with the axis $X_A$.

The roll angle $\phi$ is the rotation angle about the axis X of the mobile reference frame, which brings the projection of the axis $Y_A$ of said mobile reference frame onto the plane XY of the translated reference frame into coincidence with the axis Y of the translated reference frame.

Figure 5:
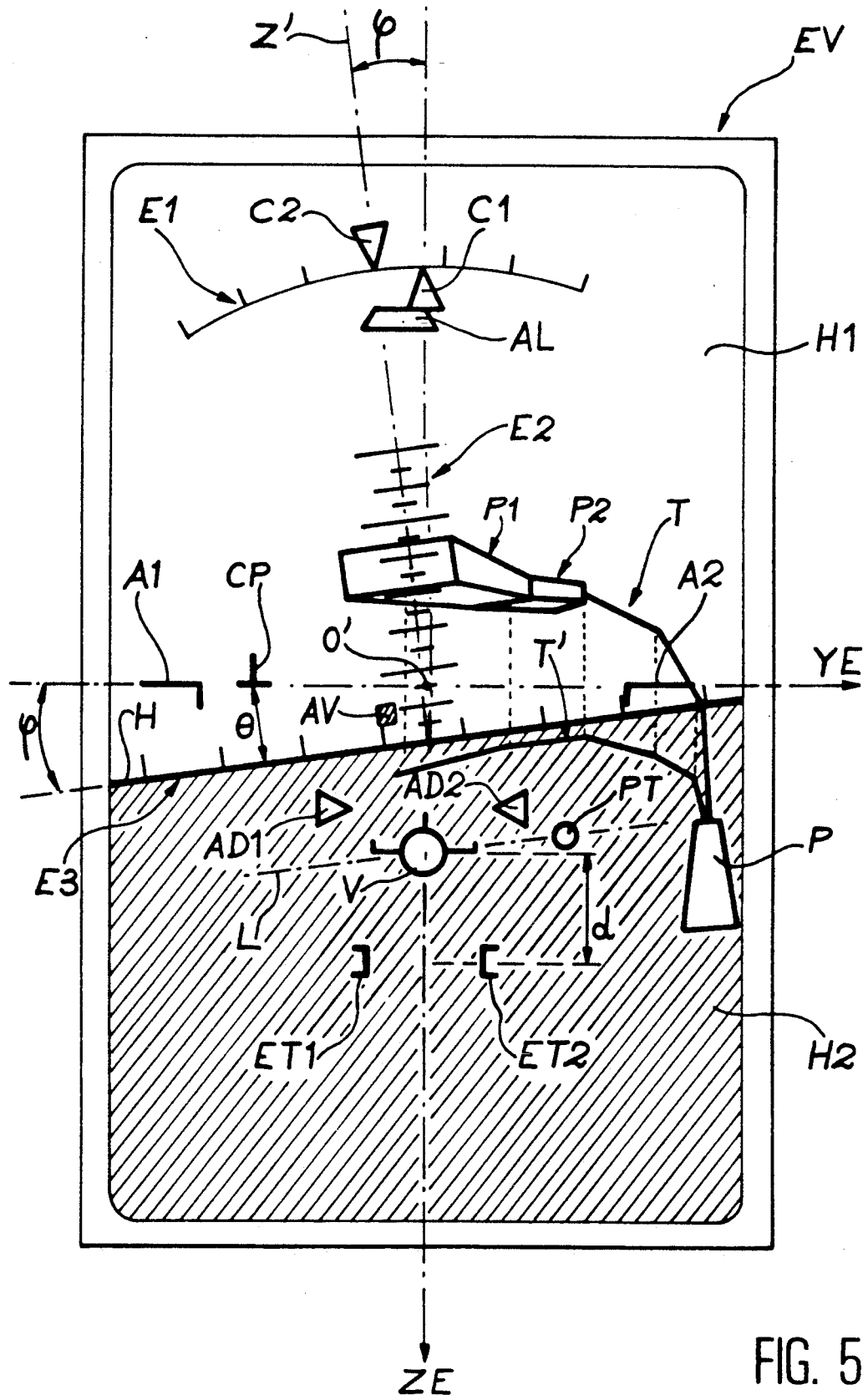
FIG. 5 shows diagrammatically an on board display screen on which appear the flying aid symbols obtained according to the process of the invention for runway approach segments.
Figure 6A:
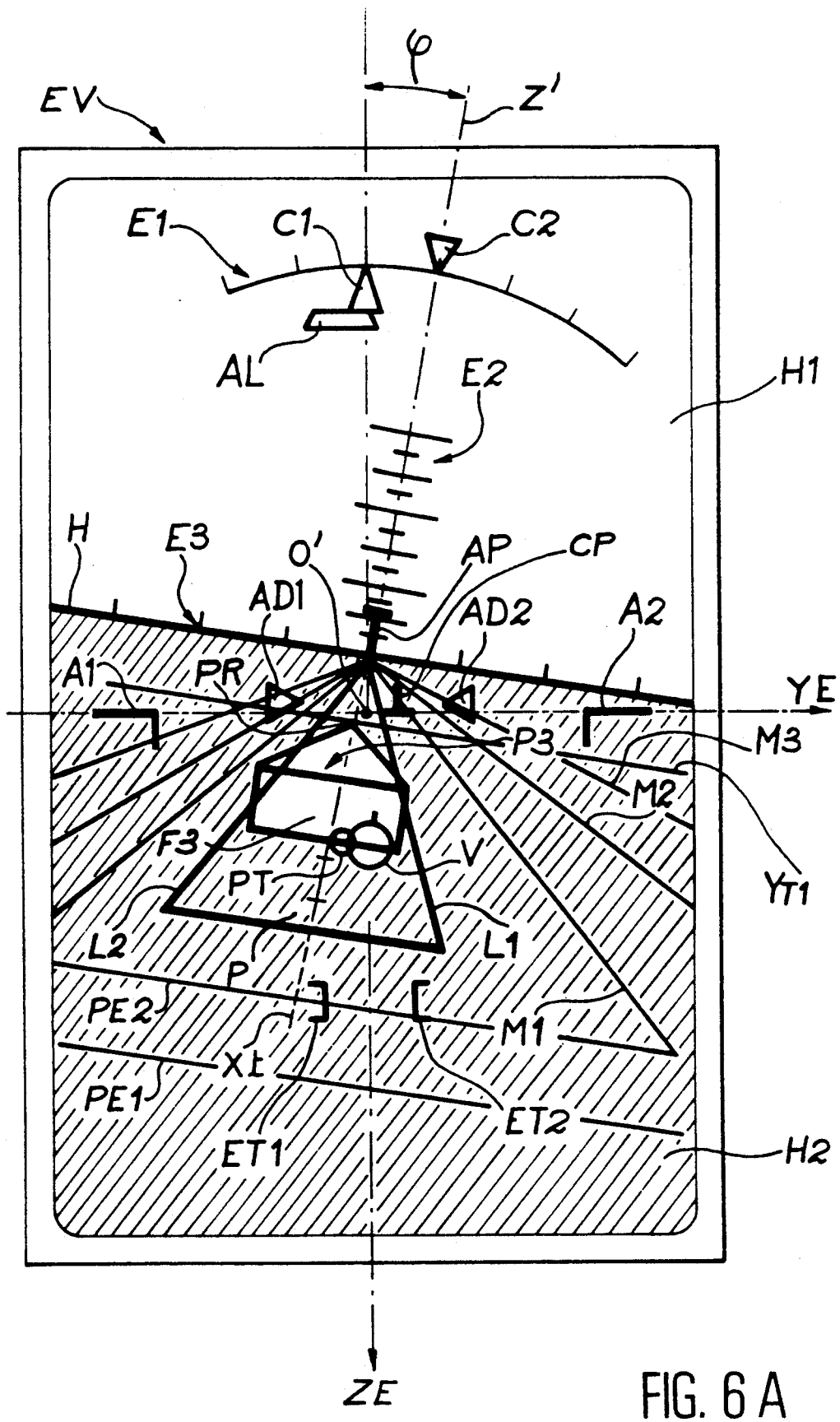
FIGS. 6A and 6B show diagrammatically the symbols appearing on the screen for two embodiments of the inventive process.
Figure 6B:
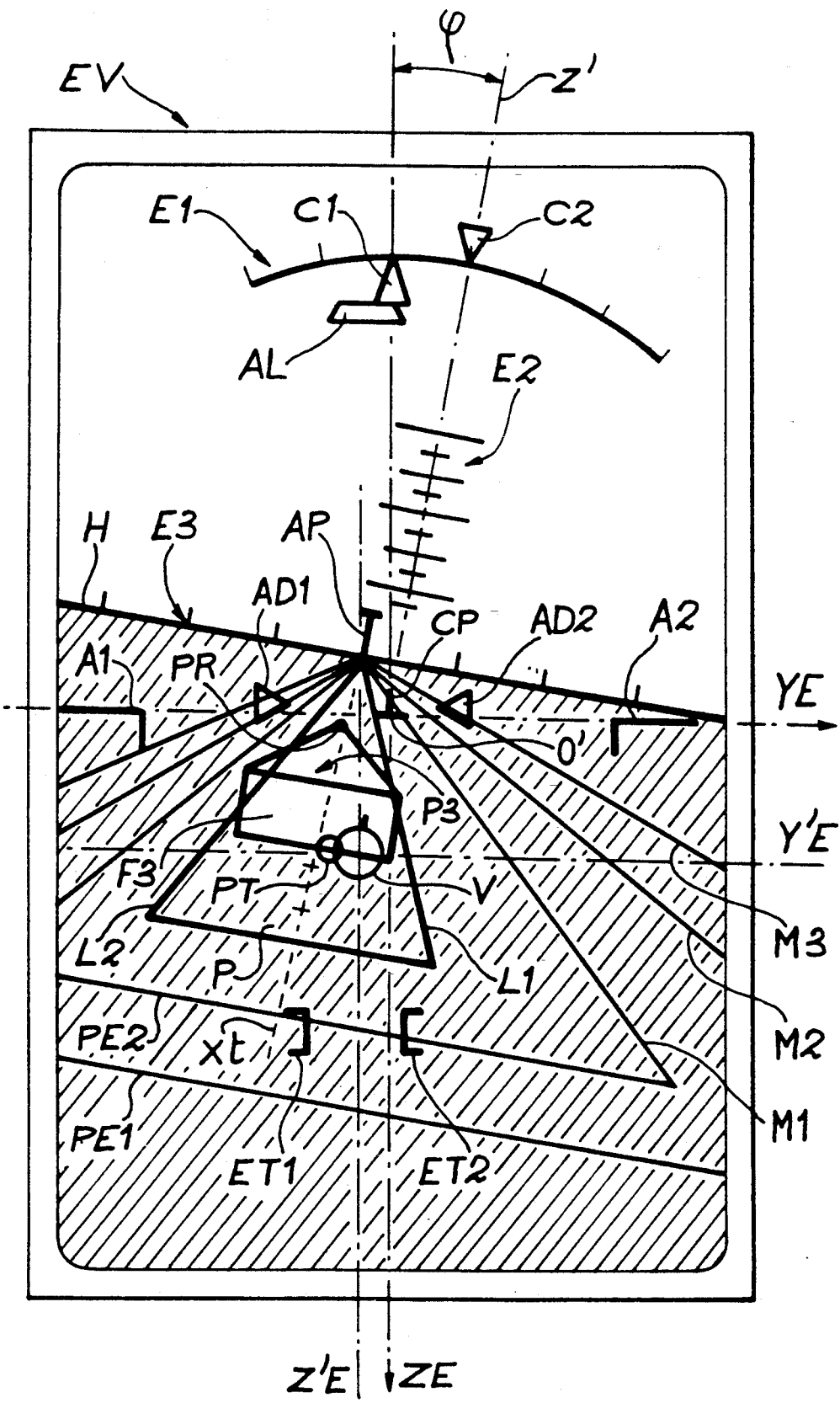

On the basis of previously recorded reference coordinates, effective coordinates measured during flight, respectively corresponding values of the Eulerian angles and orientations of the speed vector, processed in known manner by the on board computer, display (step 5. FIG. 10) then takes place by the display means EV located on the flight deck and connected to the on board computer, of a symbolic image assumed to be formed in a plane perpendicular to the first axis $X_A$ of the mobile reference frame, in the vicinity of the aircraft's center of gravity G. As will be shown hereinafter, said image particularly comprises the three-dimensional representation of the flight path and the runway, obtained in a plane perpendicular to the aircraft axis $X_A$. In known manner, particularly from the aforementioned patent, this image has for each approach segment and as shown in FIGS. 5, 6A and 6B the following symbols:

two identical fixed symbols A1, A2, representing the aircraft wings and aligned on a first axis $O'Y_E$ of the screen, parallel to the second axis $Y_A$ of the mobile reference frame and passing through a central point O' of the screen;

a line H mobile in inclination and in translation towards the top or bottom of the screen and called the artificial horizon, which subdivides the screen into a top part H1 representing the sky and a bottom part H2 representing the ground; this artificial horizon line makes it possible to reference in known manner relative to the symbols A1, A2 the wings of the aircraft and in particular the values of the roll angle $\phi$ during the traversing of the flight path (FIG. 5);

a symbol CP representing an aircraft model. The symbols CP is located on the first axis O'YE of the screen between the two symbols A1, A2 representing the aircraft wings. It indicates the aircraft heading or orientation by projecting on the artificial horizon (orientation of the aircraft axis $X_A$) with respect to the reference mark frame. A graduated heading scale E3 extends over the artificial horizon H and makes it possible to reference the aircraft axis. The attitude $\theta$ of the aircraft is designated by the distance between said symbol CP and the horizon H;

a symbol V indicating the orientation of the aircraft speed vector, mobile in accordance with said orientation, at least along a second axis $O'Z_E$ of the screen, passing through the central point O' and perpendicular to the first axis $Y_E$ of the screen.

FIGS. 5 and 6A illustrate an embodiment of the process according to the invention, in which the aircraft model symbol CP is mobile on the first screen axis $Y_E$ and in which the speed vector orientation indicating symbol V is mobile in accordance with said orientation on the second axis $Z_E$ of the reference mark frame.

FIG. 6B illustrates a variant of this embodiment, in which the aircraft model symbol CP is fixed and located at the central point O' of the screen. The speed vector orientation indicating symbol V is mobile in accordance with this orientation on a first secondary axis $Y'_E$, parallel to the first screen axis $Y_E$, and on a second secondary axis $Z'_E$, parallel to the second axis $Z_E$ of the screen.

Figure 7:
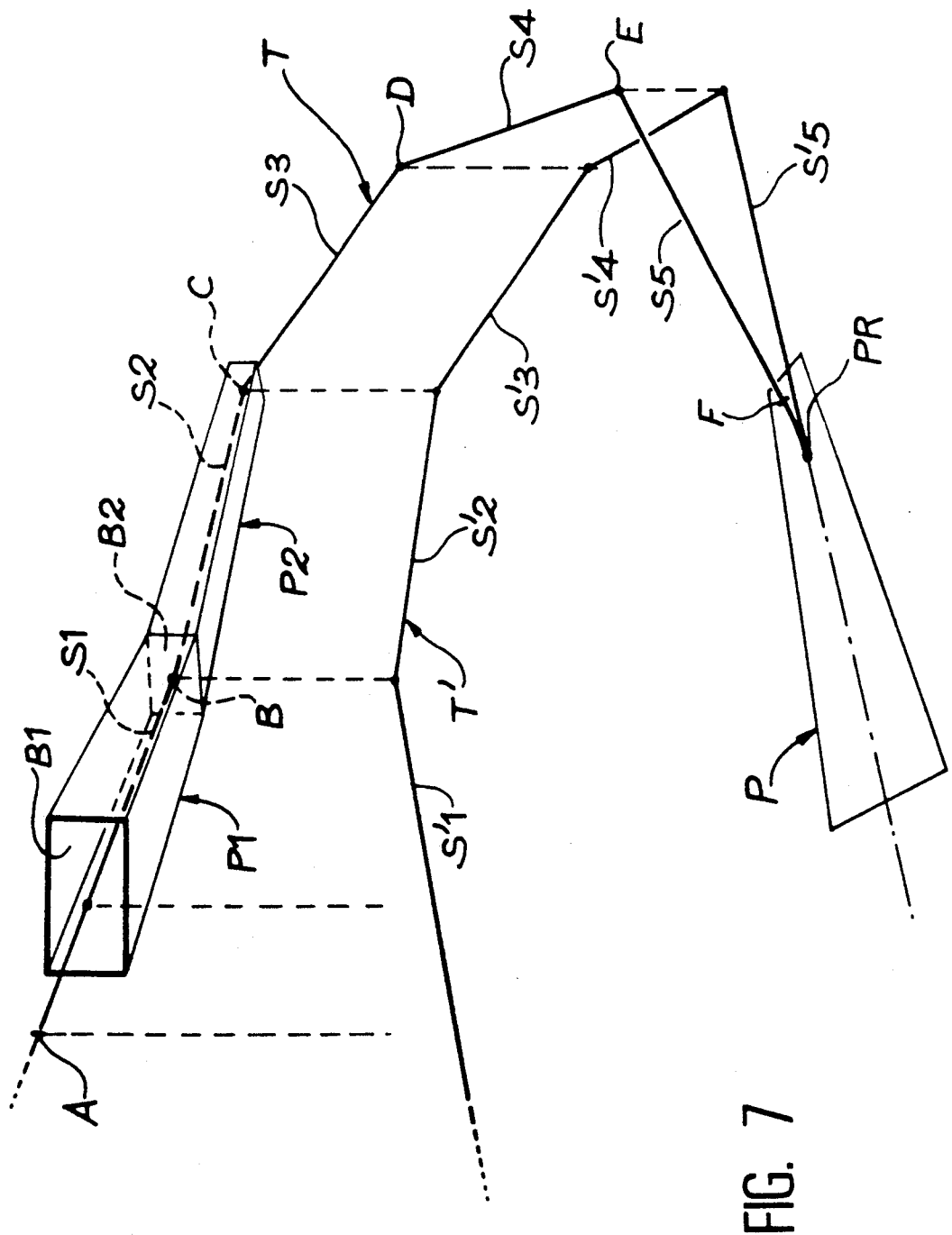
FIG. 7 shows diagrammatically the flight path in perspective and the flight path projected onto a horizontal plane, such as they appear on the screen of FIG. 5.

According to the invention, the process also consists of displaying in accordance with a three-dimensional representation diagrammatically shown in FIG. 7, the approach segments S1 to S5 located on the flight path to be followed by the aircraft. This representation also appears on the display screen EV of FIG. 5. The segment S1 being followed, as well as the next segment S2 are respectively displayed by two parallelepipeds P1, P2 in perspective and which will be defined hereinafter. The other segments such as S3, S4 and S5 are shown normally.

Each of the parallelepipeds such as P1 represents a signal which must be entered by the aircraft in order to best traverse the segment S1. The ideal traversal is that for which the center of gravity of the aircraft is located on the segment S1 and that for which the aircraft speed vector has the same direction as the segment S1. Each parallelepiped such as P1 is represented in perspective and in elongated form along the corresponding segment S1, which constitutes the major axis of the parallelepiped. The parallelepiped P1 has, in the traversing direction of the segment S1, an entry base B1 and an exit base B2 in rectangular form.

The entry base B1 represents the entry or entrance window of the tunnel to be traversed by the aircraft. The exit base B2 represents the exit or exit window of the tunnel P1 and the entrance to the tunnel P2. Bearing in mind the perspective representation of the tunnel, the entry base B1, which is closest to the aircraft, always appears to have a larger size than the more remote exit base B2, as will be shown in greater detail hereinafter. When the tunnel represented by the parallelepiped P1 has been traversed, the aircraft enters the tunnel P2 corresponding to the segment S2, whilst another not shown tunnel corresponding to the segment S3 appears.

The segments and tunnels are plotted as a function of the effective coordinates of the center of gravity of the aircraft and the values of the Eulerian angles. The entry base of each parallelepiped is positioned beforehand by a constant delay in front of the aircraft, so that the faces of the parallelepiped surrounding the segment S1 shorten as the aircraft advances. Thus, the aircraft never enters the target tunnel, which has an entrance, which permanently recedes in front of the aircraft to facilitate its guidance. In FIG. 7, the entry base B1 of the tunnel P1 is in advance with respect to the aircraft.

Figure 8A:
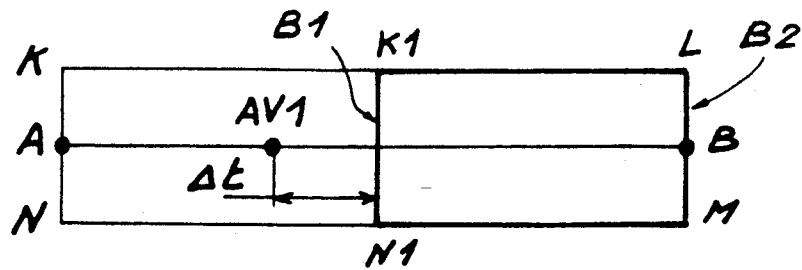
FIGS. 8A & 8B show a lateral face of a parallelepiped surrounding a segment traversed by the aircraft at two different times during the latter and providing a better understanding of the flight path display principle according to the inventive process.
Figure 8B:
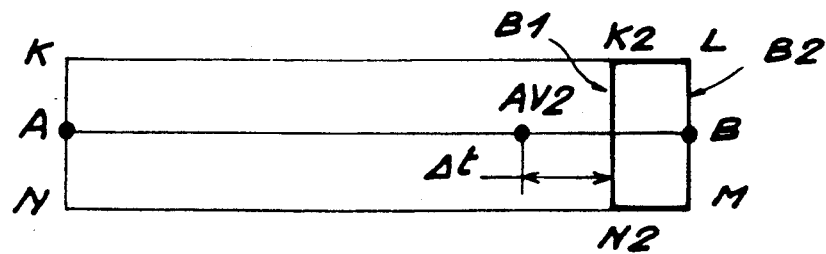

FIGS. 8A and 8B provide a better understanding of the principle of shortening the faces of the parallelepiped surrounding the segment AB during the traversing of this segment by the aircraft. They show a lateral face of the parallelepiped, the aircraft occupying the position AV1 at a time t1 (FIG. 8A) and the position AV2 at a subsequent time t2 (FIG. 8B). The lateral face of the parallelepiped, before the start of traversing segment AB, is represented by the rectangle KLMN.

At time t1, said face is represented by the rectangle K1LMN1. B1 and B2 respectively designate the entry and exit bases viewed laterally. Base B1 is in advance with respect to the aircraft by a time interval or delay $\Delta t$. At time t2, the lateral face of the parallelepiped is represented by the rectangle K2LMN2. The entry base B1 is still in advance by the same delay $\Delta t$ with respect to the aircraft, but the lateral face of the parallelepiped at time t2 is shorter than the same face at time t1.

Figure 8C:
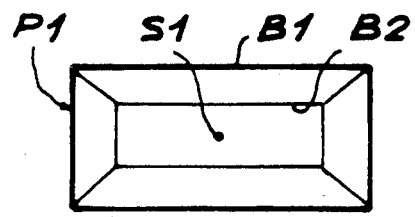
FIGS. 8C & 8D show diagrammatically flying aid windows appearing on the display screen in the case of an ideal passage through a flight path segment, respectively at the start and finish of traversing a flight path segment.
Figure 8D:
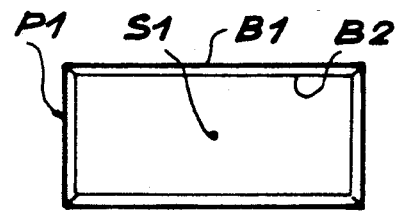
Figure 9:
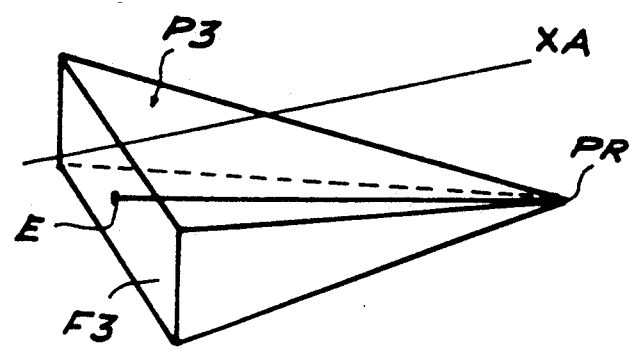
FIG. 9 shows diagrammatically a pyramidal volume surrounding a final segment, also shown in FIG. 6.

FIGS. 8C and 8D diagrammatically represent a case of an ideal traversal of the segment S1. The aircraft speed vector has the same direction as the segment S1 (which is then a point on the drawing) and the center of gravity of the aircraft is on the segment S1. In FIG. 8A aircraft has started to traverse the tunnel P1 corresponding to the segment S1 (the bases B1 and B2 having very different dimensions), whilst in FIG. 8B the aircraft is almost at the end of the passage through the segment S1 (bases B1 and B2 have similar dimensions) and is about to enter the tunnel corresponding to the segment S2.

For a final segment such as S5 (FIGS. 6A, 6B, 7 and 9) a volume surrounding said segment is also shown in the form of a pyramid P3 in perspective and having a rectangular base. As for an approach segment, the shape of this pyramid and its location on the display screen are dependent on the effective coordinates of the positions of the center of gravity of the aircraft and the values of the Eulerian angles. As for the preceding segments, the entry base F3 of the pyramid is positioned in advance of the aircraft by a constant delay.

The apex of the pyramid corresponds to the touchdown point PR of the wheels on the runway. As soon as the aircraft reaches the start D of the final segment S4 preceding the approach segment S5, said pyramid appears. When the aircraft arrives at E, the entry window or base F3 of the pyramid has a size equal to that of the section of the exit window of the approach segment S4 preceding the final segment S5. Then, during the traversal of the final segment or an adjacent flight path, the size of the window F3 decreases to the wheel touchdown point PR. In FIGS. 6A and 6B it is assumed that the aircraft has started the traversal of the final segment S5.

The apex and faces of the pyramid gradually disappear during the traversal of the rounding off portion AR. The aircraft has then left the final segment S5 to join, by a rounded off portion, a horizontal flight path S6 (FIG. 2) close to the wheel touchdown point. The base of the pyramid then maintains a constant dimension close to that of the speed vector symbol V, which will be described in greater detail hereinafter.

The bases B1, B2 and F3 of each parallelepiped in perspective P1, P2 and of the pyramid P3 are in each case sides located on the screen as a function of instantaneous coordinates of the origin of the mobile reference frame (coordinates of the aircraft's centre of gravity G) relative to the reference mark frame and the aircraft Eulerian angles. At each instant, when the aircraft is correctly located on a segment and its advance is taking place correctly along said segment, the speed vector orientation indicating symbol V must be located in the center of the entry base B1 and the exit base B2 of a parallelepiped such as P1 (for an approach segment), or in the center of the base of the pyramid P3 (for a final segment). At each instant, when the aircraft performs the correct movement for joining the preestablished flight path, the speed vector orientation indicating symbol V must be located in the center of the entry base B1.

As shown in FIGS. 5 and 7, the process also consists of displaying on the screen EV, apart from the tunnels and segments in perspective, the runway P and the projection T' on the plane of the runway the flight path T remaining to be traversed. This projection involves segments S'1, S'2, S'3, S'4 and S'5, which are projections of the segments S1 to S5 on the plane of the runway, i.e. on the ground. It makes it possible for the pilot to act by anticipation on the lateral flight controls in order to follow the flight path as closely as possible.

On the basis of the measured values of the roll angles during flight, the process according to the invention also consists of displaying at all times a scale E1 of the roll values $\phi$.

This scale (FIGS. 5, 6A and 6B) is in the form of a graduated circular arc, rotatable about the central point O' of the screen. It has a first slide or cursor C1 fixed to the screen and linked with said scale and located on the second screen axis $O'Z_E$. This cursor C1 indicates the direction of the third axis $Z_A$ of the mobile reference frame. This scale also has a second cursor C2, which is mobile with the scale and linked therewith. This cursor is located on a third axis O'Z' of the screen passing through the central point O' of said screen. The third axis is parallel to the third axis OZt of the reference mark frame during the roll movement. The roll angle $\phi$ is indicated by the angular displacement (measured by graduations on the circular arc) between the fixed cursor C1 and the mobile cursor C2. When roll is zero, the cursors C1 and C2 are positioned facing one another.

In order to supplement the information supplied to the pilot, the process also consists of displaying a graduated attitude scale E2. This scale extends along the third axis O'Z' of the screen from the artificial horizon H to the mobile roll scale E1. The value of the attitude $\theta$ is given by the projection of the aircraft symbol CP onto the graduated scale E2.

By two identical symbols ET1, ET2, a display also takes place of the total energy to be adopted for reaching a selected speed. These two symbols are located on a line parallel to the first axis $O'Y_E$ of the screen and are mobile along the second axis $O'Z_E$. The distance between these two symbols and the speed vector symbol V represents the difference between the selected speed and the effective speed of the aircraft. The processing of these values of the speeds makes it possible to fix the value of this variation on the screen. In the embodiment illustrated in FIG. 6A, the symbols ET1 and ET2 are arranged symmetrically with respect to the second axis $Z_E$ of the screen. In the variant illustrated in FIG. 6B, the symbols ET1 and ET2 are arranged symmetrically with respect to the second secondary axis $Z'_E$.

The process also consists of displaying the acceleration or deceleration tendency by two other identical symbols AD1 and AD2 placed on a line parallel to the first screen axis $O'Y_E$. These symbols indicate by their position relative to the speed vector V, the acceleration or deceleration tendency and move along the second screen axis $O'Z_E$. They are located above the speed vector symbol V if there is an acceleration tendency and below it if there is a deceleration tendency. The difference between the speed vector V and the symbols AD1 and AD2 is proportional to the acceleration of the aircraft on the flight path. The on board computer easily determines this tendency on the basis of signals supplied by on board acceleration, speed and attitude measuring means. The position of the symbols AD1 and AD2, read on the scale E2, also represents the slope to be followed by the aircraft, when maintaining its present speed, i.e. without acceleration on its flight path.

In the embodiment illustrated by FIG. 6A, the symbols AD1 and AD2 are arranged symmetrically with respect to the second axis $Z_E$ of the screen. In the variant illustrated in FIG. 6B, these symbols are arranged symmetrically relative to the second secondary axis $Z'_E$.

In order to facilitate the lateral correction of the flight path, the process also consists of displaying a flight path prediction symbol PT in a horizontal plane (runway plane). This symbol is mobile on a line passing through the center of the speed vector symbol V and parallel to the artificial horizon H. The symbol PT indicates the horizontal curvature of the flight path, i.e. the direction of the position which will be occupied by the aircraft at a predetermined future time, e.g. in 10 seconds, relative to the horizontal plane (plane of the first and second axes of the reference mark frame) if it maintains its roll angle and speed at their present values. This symbol is displayed taking account of the values of the Eulerian angles.

Another symbol AL, called the sideslip or lateral acceleration symbol, is also displayed according to the inventive process. This symbol is mobile parallel to the first axis $O'X_E$ of the screen and is linked with the first fixed cursor Cl of the roll scale E1. The lateral displacement of this symbol is fixed by the on board computer on the basis of the processing of data relating to the lateral acceleration, obtained by on board acceleration measuring means.

In order to facilitate the action of the pilot on the flight controls, particularly on the final segment, the process consists of displaying (FIGS. 6A and 6B) the direction of the runway on the artificial horizon H, by a mobile symbol AP, linked with the horizon H and positioned thereon as a function of the roll angle and the attitude angle of the aircraft.

Finally, apart from the pyramid displayed during the traversing of the final segment, there is also a display in perspective of the runway P, the runway axis Xt, an axis Yt1 perpendicular to the runway axis at the wheel touchdown point PR and a grid of parallel lines (such as M1, M2, M3) and perpendicular (such as PE1, PE2) to the runway axis. These grid lines are seen in perspective on the screen and appear to lead to a common point located on the artificial horizon and coinciding with the symbol AP. This grid makes it possible for the pilot to better evaluate the position of the aircraft relative to the axis of the runway and the approach speed with the wheel touchdown speed, both in accordance with the vertical axis Zt and in accordance with the horizontal axis Yt.

In order to improve the quality of the display, different colors can be used. Thus, e.g. the sky can be blue, the ground maroon, the roll, attitude and horizon scales white and the different symbols representing the aircraft parameters yellow.

Finally and although not shown, a portion of the screen can be reserved for the display of complimentary information useful for flying and piloting, such as the value of the speed, the attitude, the vertical speed, etc.

We claim:

1. Process for the display of flying aid symbols on a screen (EV) on board an aircraft, for traversing a flight path formed by successive approach segments (S1 to S4), a final segment (S5) and a rounding off segment traversed up to the touchdown point (F) of the aircraft wheels on a runway (P) comprising:

defining a fixed reference mark frame (O, Xt, Yt, Zt) linked with the runway and having orthogonal axes, having for its origin a theoretical wheel touchdown point on the runway, said point being located on a longitudinal axis of the runway, the fixed reference frame having a first axis (Xt) coinciding with the longitudinal axis of the runway, a second axis (Yt) perpendicular to the first axis in a plane of the runway and a third axis (Zt) perpendicular to the first and second axes of the fixed reference mark frame;

defining a mobile reference mark frame (G, $X_A$, $Y_A$, $Z_A$) linked with the aircraft and having for its origin the center of gravity (G) of the aircraft and a first axis ($X_A$) coinciding with a longitudinal axis of the aircraft, a second axis ($Y_A$) perpendicular to a plane of symmetry of the aircraft and passing through the longitudinal axis and a third axis ($Z_A$) perpendicular to the first and second axes of the mobile reference mark frame;

recording in a memory of on board computer, reference coordinates of the essential points of the segments of the flight path (S1 to S5, PR) measured in the fixed reference mark frame (Co, Xt, Yt, Zt);

determining on the basis of information received from an inertial system, the coordinates of the effective positions of the aircraft relative to the fixed reference mark frame, during the traversing of the flight path, as well as values respectively corresponding to the roll ($\phi$), attitude ($\theta$) and bearing ($\psi$) angles or Eulerian angles of the aircraft, and the orientations of a speed vector (V) of the aircraft, measured in the mobile reference mark frame;

displaying on said screen (EV) during the traversing of the flight path, an image obtained in a plane perpendicular to the first axis ($X_A$) of the aircraft, in the vicinity of its center of gravity (G) following a processing of the values of the Eulerian angles, of the effective coordinates, of the reference coordinates and the orientations of the speed vector, said image comprising at least:

two identical fixed symbols (A1, A2) representing the aircraft wings, aligned on a first axis ($Y_E$) of the screen, parallel to the second axis ($Y_A$) of the mobile reference frame and passing through a central point (O') of the screen, a symbol (CP) representing a model of the aircraft indicating the orientation of the longitudinal axis of the aircraft and moving along the first axis of the screen, between the two fixed symbols representing the wings of the aircraft, a line (H) moving in translation and in inclination, called the artificial horizon, subdividing the screen (EV) into an upper part (H1) representing the sky and a lower part (H2) representing the ground, and making it possible to reference with respect to the fixed symbols representing the aircraft wings, the roll ($\phi$) and attitude ($\theta$) pitch angles of the aircraft during passage, said line being graduated so as to form a heading scale and for indicating the bearing ($\psi$) of the aircraft, a symbol (V) indicating the orientation of the speed vector of the aircraft and mobile along said orientation, along a second axis ($Z_E$) of the screen (EV) and passing through the central point (O') and perpendicular to the first axis (YE) of the screen, characterized in that it also comprises displaying in accordance with a three-dimensional representation, approach segments (S1 to S5) located on the flight path to be covered by the aircraft, the segment being traversed, as well as at least the segment following that being traversed, being respectively displayed in accordance with two elongated parallelepipeds, in perspective, having respectively segments for axes, each parallelepiped in perspective, having in the traversing direction of the corresponding segment, an entrance base (B1) into the segment and an exit base (B2) from the segment, said bases being rectangular, so that during the traversing of a segment, the entry base (B1) of a parallelepiped corresponding to said segment has a fixed dimension in the reference mark frame and the exit base (B2) an increasing dimension between a minimum dimension, when the aircraft starts to traverse this segment, and a maximum dimension equal to the dimension of the entry base (B1) with which it coincides at the end (B) of the traversing of said segment and at the start of the traversing of the following segment (S2) of the flight path, the process also consisting of displaying the final segment (S5) in the form of a pyramid (P3) in perspective and having a rectangular base (F3), with on the screen an apex corresponding to the touchdown point (PR) of the wheels on the runway, so that during the traversing of the final segment, the base (F3) of the pyramid of the final segment (S5) has a decreasing dimension during the traversing of said final segment up to the touchdown point (PR) of the wheels, each base of the parallelepiped and the base of the pyramid having sides located on the screen (EV) as a function of the values of the Eulerian angles and coordinates of the origin (G) of the mobile reference mark frame with respect to the fixed reference mark frame, the symbol indicating the orientation of the speed vector (V) having to be located in the center of the entry base (B1) of the parallelepiped (P1) in perspective, representing the segment being traversed, or in the center of the base (F3) of the pyramid (P3) representing the final segment, when the aircraft is correctly located on a segment.

2. Process according to claim 1, characterized in that the entry base of each parallelepiped, as well as the base of the pyramid are positioned in advance by a constant delay in front of the aircraft.

3. Process according to claim 2, characterized in that at the start of traversing a rounded off flight path segment during which the aircraft leaves the final segment (S5) for joining by a rounded off portion a horizontal flight path (S6) immediately preceding wheel touchdown, the sides of the base of the pyramid maintain a constant dimension close to that of the symbol of the speed vector, which is circular.

4. Process according to claim 1, characterized in that it also consists of displaying on the screen the runway and the projection on the plane of the runway the flight path still to be covered.

5. Process according to claim 1, characterized in that it also comprises displaying a roll scale (E1) shaped like a circular arc and rotatable about a central point (O') of the screen, said scale having a first slide or cursor (C1) fixed to the screen and linked with said scale (E1) on the second axis ($Z_E$) of the screen, in order to indicate the direction of the third axis ($Z_A$) of the mobile reference frame, and a second slide or cursor (C2) moving with the scale (E1) and linked with the latter, located on a third mobile axis (Z') of the screen, passing through the central point (O') of the screen and remaining parallel to the third axis ($Z_A$) of the reference mark frame during a roll movement, the roll angle ($\phi$) being indicated by the displacement between the fixed cursor (C1) and the mobile cursor (C2), and displaying the lateral acceleration or sideslip of the aircraft by a symbol mobile parallel to the first axis of the screen and linked with the first fixed cursor of the roll scale.

6. Process according to claim 5, characterized in that it also comprises displaying an attitude scale (E2) extending along the third axis (Z') of the screen from the artificial horizon (H) to the mobile roll scale (E1).

7. Process according to claim 1, characterized in that it also comprises displaying the tendency to acceleration or deceleration of the aircraft on the flight path, by two identical tendency indicating symbols (AD1, AD2) arranged parallel to the first axis ($Y_E$) of the screen and mobile parallel to the second axis ($Z_E$), said two symbols being located above the speed vector symbol (V) if the tendency is to acceleration and below the speed vector symbol (V) if the tendency is to deceleration, the distance between the speed vector symbol and the two acceleration or deceleration tendency symbols (AD1, AD2) being proportional to the acceleration of the aircraft on the flight path.

8. Process according to claim 7, characterized in that it also comprises displaying the total energy variation direction to be adopted in order to reach a selected speed, by two identical energy variation direction indicating symbols (ET1, ET2) arranged parallel to the second axis of symmetry ($Z_E$) of the screen, said two symbols being mobile parallel to the second axis ($Z_E$) of the screen, the distance between these two variation direction symbols and the speed vector symbol representing the difference between the selected speed and the effective speed of the aircraft.

9. Process according to claim 8, characterized in that the symbol (CP) representing an aircraft model is mobile along the first screen axis ($Y_E$), the symbols (A1, A2) representing the aircraft wings, the acceleration and deceleration tendency indicating symbols (AD1, AD2) and the energy variation direction indicating symbols (ET1, ET2) are arranged symmetrically with respect to the second screen axis ($Z_E$).

10. Process according to claim 8, characterized in that the symbol (CP) representing a model of the aircraft is fixed and located at the central point O' of the screen, the symbols (A1, A2) representing the wings of the aircraft being positioned symmetrically relative to the second axis of the screen, the symbol (V) indicating the orientation of the speed vector being mobile, in accordance with said orientation, on a first secondary axis ($Y_E'$) of the screen parallel to the first axis ($Y_E$) of the reference mark frame and on a second secondary axis ($Z_E'$) of the screen parallel to the second axis ($Z_E$) of the reference frame, the acceleration or deceleration tendency indicating symbols (AD1, AD2) and the energy variation direction indicating symbols (ET1, ET2) being positioned symmetrically relative to the second secondary axis.

11. Process according to claim 1, characterized in that it also comprises displaying a flight path prediction by a symbol (PT) mobile on a line passing through the speed vector symbol (V) and parallel to the artificial horizon line (H), said prediction symbol indicating the aircraft position direction at a predetermined future time projected onto the first two axes of the mobile reference frame.

12. Process according to claim 1, characterized in that it also comprises displaying the orientation of the runway (P) on the artificial horizon (H) by a mobile symbol (AP) linked with the artificial horizon (H) and positioned thereon as a function of the value of the roll angle ($\phi$) and the heading of the aircraft.

13. Process according to claim 1, characterized in that it also comprises displaying the runway, the runway axis (Xt), a line perpendicular to the runway axis at the wheel touchdown point and a grid of lines parallel (M1, M2, M3) and perpendicular (PE1, PE2) to the runway axis.

14. Process according to claim 13, characterized in that it comprises using specific colors for representing the ground, the sky, symbols, the artificial horizon, scale cursors, the runway and said grid of lines.

15. Process according to claim 14, characterized in that it also comprises displaying on the screen complimentary information useful in flying the aircraft.

16. Process according to claim 13, characterized in that it comprises using specific colors for representing the ground, the sky, symbols, the artificial horizon, scale cursors, the runway and said grid of lines.

17. Process according to claim 16, characterized in that it also comprises displaying on the screen complimentary information useful in flying the aircraft.

* * * * *